(12) United States Patent
Brandstatter et al.

(10) Patent No.: US 10,256,582 B1
(45) Date of Patent: Apr. 9, 2019

(54) GROMMET ASSEMBLY HAVING ELECTRICAL POWER RECEPTACLE

(71) Applicant: Premier Manufacturing Group, Inc., Shelton, CT (US)

(72) Inventors: Michael Brandstatter, Milford, CT (US); Bernard Bensussan, Stratford, CT (US); Michael O'Keefe, Wethersfield, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 15/833,029

(22) Filed: Dec. 6, 2017

(51) Int. Cl.
| | |
|---|---|
| *H01R 13/73* | (2006.01) |
| *H01R 13/74* | (2006.01) |
| *A47B 97/00* | (2006.01) |
| *A47B 21/06* | (2006.01) |
| *H02G 3/22* | (2006.01) |
| *H02G 3/12* | (2006.01) |

(52) U.S. Cl.
CPC .......... *H01R 13/746* (2013.01); *A47B 97/00* (2013.01); *A47B 2021/066* (2013.01); *A47B 2200/0082* (2013.01); *H01R 13/74* (2013.01); *H02G 3/12* (2013.01); *H02G 3/22* (2013.01)

(58) Field of Classification Search
CPC .................. H01R 13/746; H01R 13/74; A47B 2200/0082; H02G 3/22; H02G 3/12
See application file for complete search history.

(56) References Cited

U.S. PATENT DOCUMENTS

| | | | |
|---|---|---|---|
| 6,024,599 A | 2/2000 | Stathis et al. | |
| 6,923,684 B2 | 8/2005 | Strayer | |
| 7,053,296 B2 | 5/2006 | Drane et al. | |
| 7,806,723 B2 * | 10/2010 | Chong | H02G 3/22 |
| | | | 439/571 |
| 7,989,738 B2 | 8/2011 | Byrne | |
| 8,475,186 B1 | 7/2013 | Sikkema et al. | |
| D714,726 S | 10/2014 | Byrne | |
| 8,987,642 B2 | 3/2015 | Byrne | |
| 9,024,211 B2 | 5/2015 | Stathis et al. | |
| D741,266 S | 10/2015 | Byrne et al. | |
| 9,312,653 B2 | 4/2016 | Byrne et al. | |
| D762,176 S | 7/2016 | Byrne et al. | |
| 9,748,709 B2 * | 8/2017 | Byrne | H01R 13/746 |

* cited by examiner

*Primary Examiner* — Tho D Ta
(74) *Attorney, Agent, or Firm* — Raymond A. Nuzzo

(57) ABSTRACT

A grommet assembly includes, in one embodiment, a single-piece housing having an open top end, an open bottom end, an interior region, an interior wall surrounding the interior region and a housing outer surface. A receptacle support structure is located within the interior region and attached to the interior wall for supporting an electrical power receptacle. A bottom cover is attached to the housing at the open bottom end. The bottom cover includes sidewalls, an interior side facing the interior region of the housing and an opposite exterior side. The bottom cover is configured so that the sidewalls are located within the interior region of the housing when the bottom cover is completely attached to the housing. The grommet assembly further including a fastener operable to secure the housing at an opening formed in a work surface. The fastener includes an upper surface that is configured to engage a lower surface of the work surface.

33 Claims, 24 Drawing Sheets

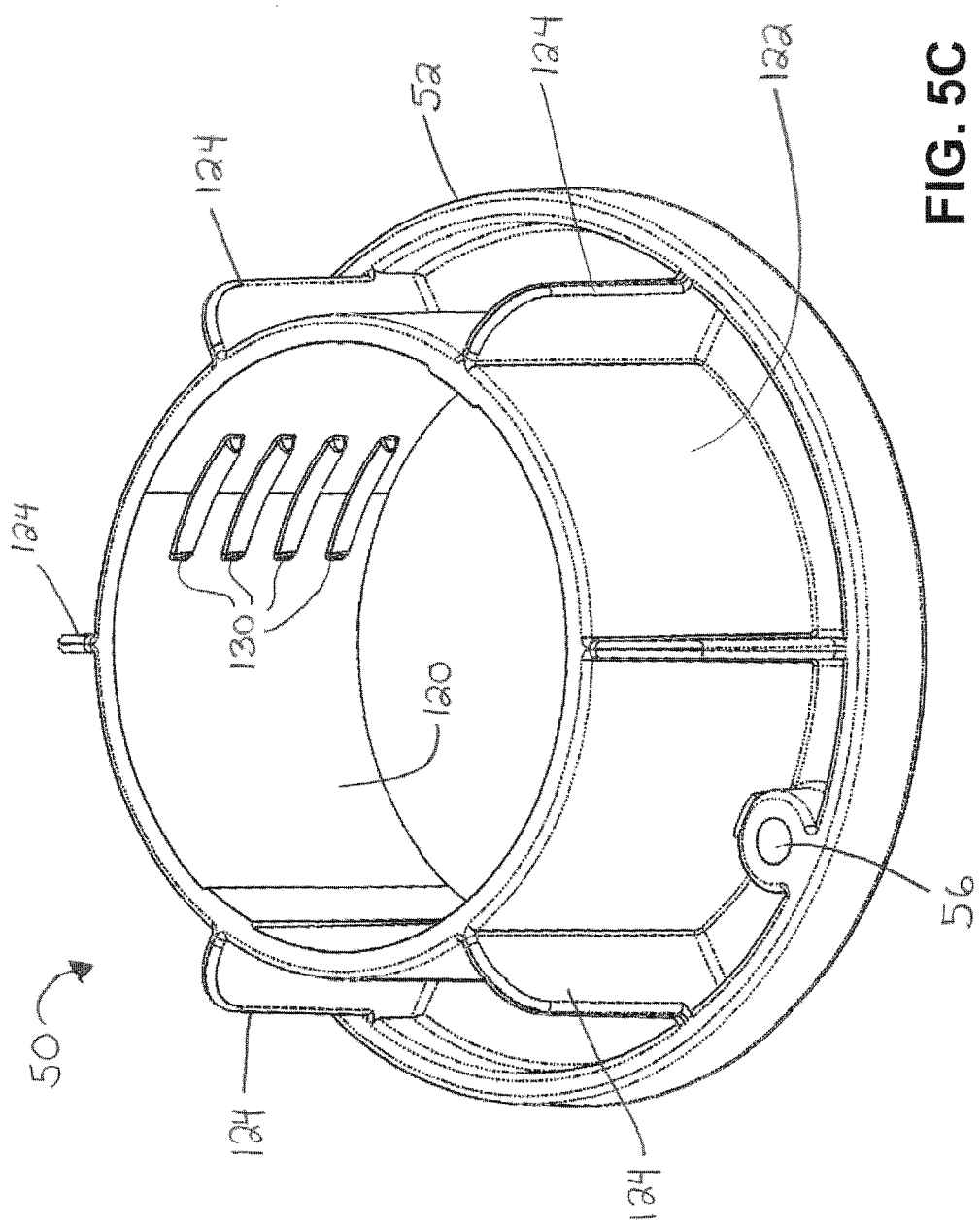

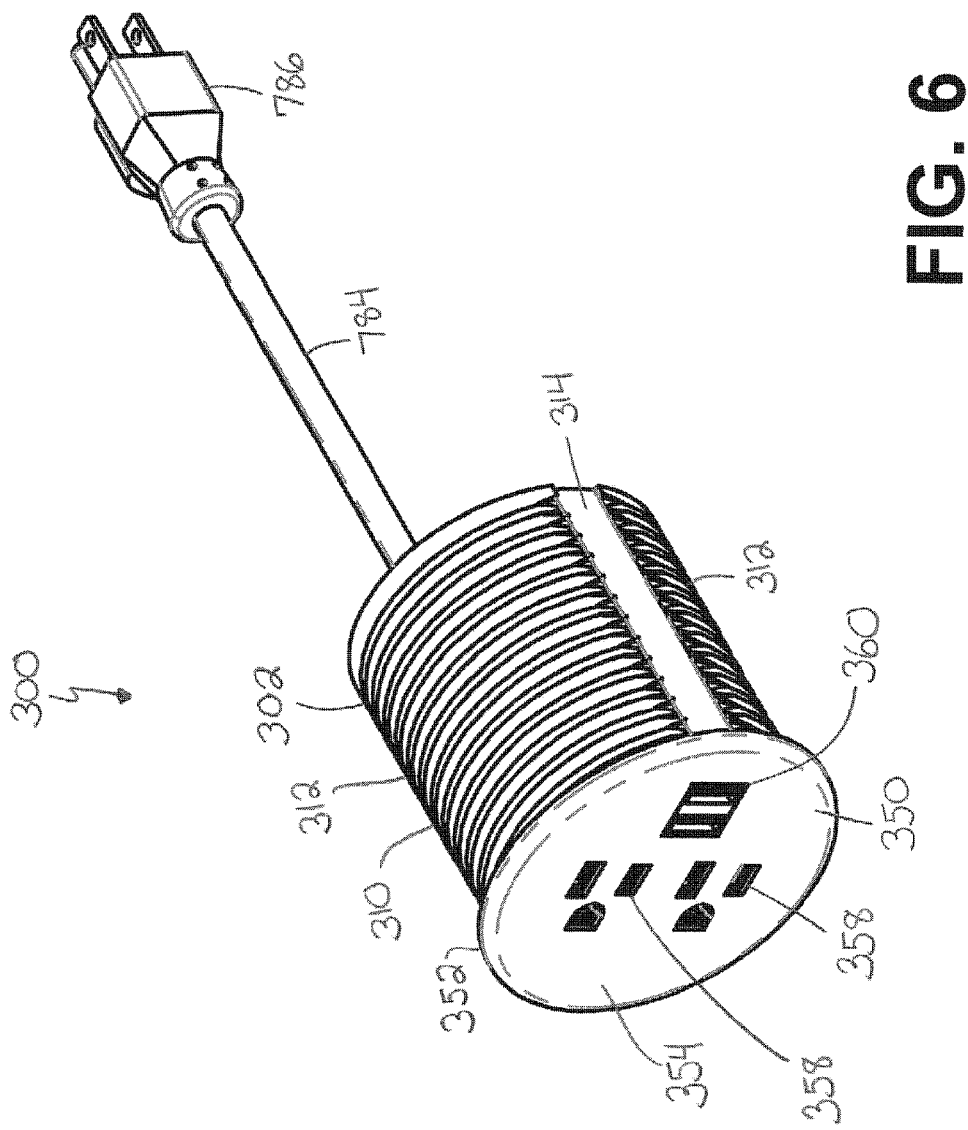

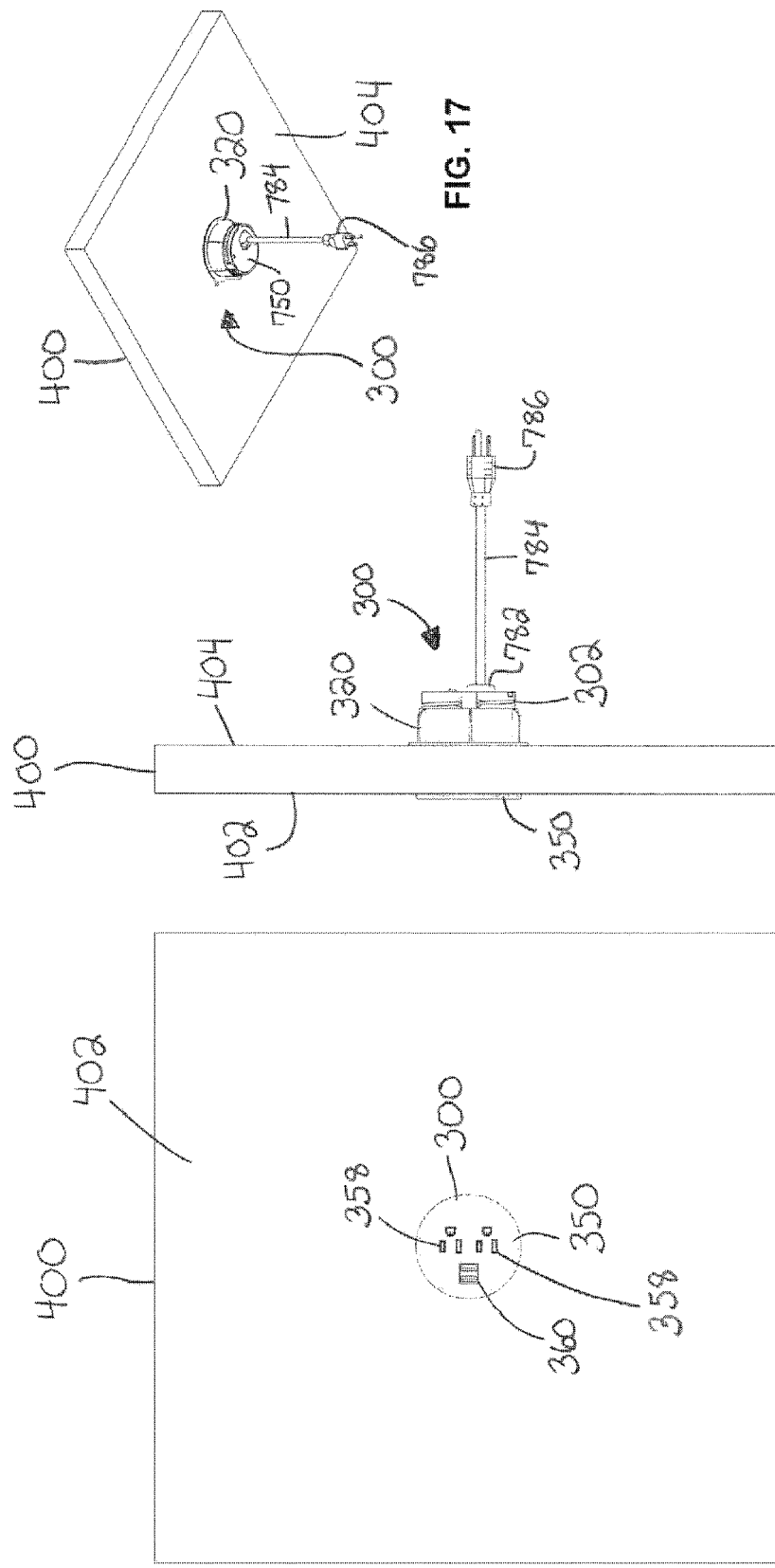

GROMMET ASSEMBLY HAVING ELECTRICAL POWER RECEPTACLE

STATEMENT OF GOVERNMENT INTEREST

Not Applicable.

CROSS REFERENCE TO OTHER PATENT APPLICATIONS

None.

FIELD OF THE INVENTION

The present invention relates to a grommet assembly for use with work surfaces such as conference tables, desks, workstations and work benches.

BACKGROUND

Grommet assemblies are described in U.S. Pat. Nos. 6,024,599, 6,923,684, 7,053,296, 7,806,723, 7,989,738, 8,475,186, 8,987,642, 9,024,211, 9,312,653, 9,748,709, D714726, D741266, and D762176.

SUMMARY OF THE INVENTION

The present invention sets forth a unique and novel grommet assembly. In some embodiments, the grommet assembly comprises a single-piece housing that includes an open top end, an open bottom end, an interior region, an interior wall surrounding the interior region and a housing outer surface. The housing is configured to support an electrical power receptacle within the interior region. The grommet assembly further includes a bottom cover removably attached to the housing at the open bottom end of the housing. The bottom cover includes sidewalls, an interior side facing the interior region of the housing and an opposite exterior side. The bottom cover is configured so that the sidewalls are totally positioned within the interior region of the housing and hidden from view when the bottom cover is completely attached to the housing. The grommet assembly further includes a fastener operable to secure the housing at an opening formed in a work surface. The fastener has an upper surface configured to engage a lower surface of the work surface.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 5C is another perspective view of the fastener, the view showing a bottom portion of the fastener;

FIG. 6 is a perspective view of a grommet assembly in accordance with another exemplary embodiment of the invention;

FIG. 15 is a plan view showing the grommet assembly as shown in FIG. 14 mounted to a work surface;

FIG. 16 is a side view showing the grommet assembly as shown in FIG. 14 mounted to the work surface; and FIG. 17 is a perspective view of the grommet assembly as shown in FIG. 14 mounted to the work surface, the view showing the fastener of FIG. 12 threadedly engaged to the housing outer surface to the fullest extent such that fastener abuts the bottom side of the work surface.

DETAILED DESCRIPTION OF EXEMPLARY EMBODIMENTS

Figure 1:
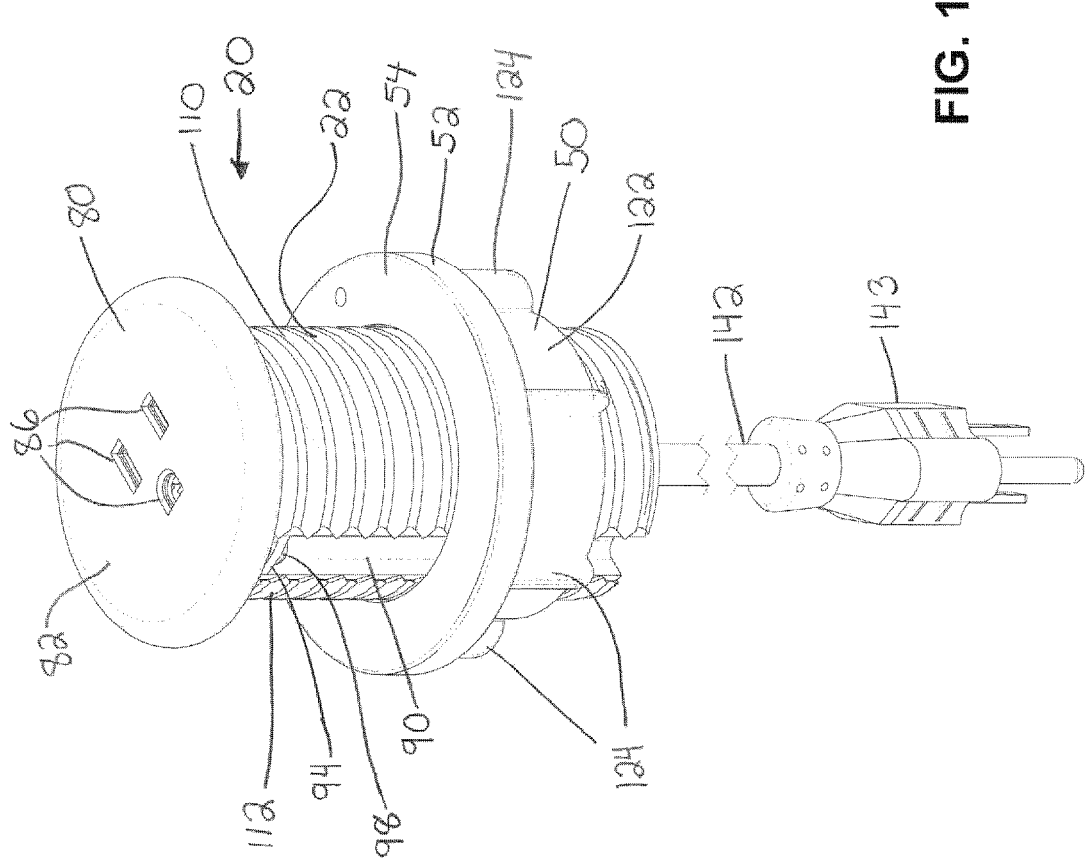
FIG. 1 is a perspective view of a grommet assembly in accordance with an exemplary embodiment of the present invention.

As used herein, "electric power receptacle" shall include any receptacle that provides an AC or DC voltage and current, including (i) AC electric power receptacles that provide 110-120 VAC, (ii) DC voltage receptacles or ports, and (iii) USB female sockets configured to charge USB-type communication devices such as smart phones, tablets, PDAs, etc. The USB female sockets include dual or twin USB Type-A Female Sockets.

As used herein, "electrical device", shall include (i) electrical cables and wires, (ii) USB male plugs that are either attached to a USB cable or part of a USB electronic device, and (iii) electrical male plug devices having a plurality of electrically conductive blades or prongs that are configured to be inserted into AC power receptacles.

As used herein, "work surface" shall include the top surface of an article of furniture such as a desktop, tabletop, work bench, work station or conference table.

It is to be understood that throughout this description, terms such as "vertical", "horizontal", "top", "bottom", "upper", "lower", "middle", "above", "below", and the like are used for convenience in identifying relative locations of various components and surfaces relative to one another in reference to the drawings and that the grommet assembly may be installed and used in substantially any orientation so that these terms are not intended to be limiting in any way.

Approximating language, as used herein throughout the specification and claims, may be applied to modify any quantitative representation that could permissibly vary without resulting in a change in the basic function to which it is related. Accordingly, a value modified by a term or terms, such as "about", are not limited to the precise value specified.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Referring to FIGS. 1-5C, there is shown grommet assembly 20 in accordance with an exemplary embodiment of the present invention. Grommet assembly 20 includes single-piece housing 22. Housing 22 includes open top end 24, open bottom end 26, interior region 28, interior wall 30 surrounding interior region 28 and housing outer surface 32. As will be described in the ensuing description, housing 22 is configured to support electrical power receptacle 34 within interior region 28. Bottom cover 36 is attached to housing 22 and is positioned over open bottom end 26. Bottom cover 36 includes a plurality of spaced apart sidewalls 38A, 38B and 38C. Bottom cover 36 includes a forth sidewall (not shown) that is located opposite sidewall 38B. Bottom cover 36 includes interior side 40 which faces interior region 28 of housing 22 and opposite exterior side 42. Bottom cover 36 is configured so that all sidewalls of bottom cover 36 are completely and totally positioned within interior region 28 and hidden from view when bottom cover 36 is completely attached to housing 22. In one embodiment, bottom cover 36 is configured so that its sidewalls contact interior wall 30.

In an exemplary embodiment, bottom cover 36 is removably attached to housing 22. Bottom cover 36 includes openings 43 to receive corresponding screws 44. In an exemplary embodiment, housing 22 includes threaded inlets (not shown) that are attached to interior wall 30 of housing 22 and configured for threaded engagement with screws 44. In such an embodiment, bottom cover 36 is screwed in place via screw 44. In one embodiment, the threaded inlets (not shown) that receive screws 44 are integral with interior wall 30. In another embodiment, these threaded inlets are attached to interior wall 30.

Referring to FIGS. 1, 2, 5A, 5B and 5C, grommet assembly 20 further comprises fastener 50 that is operable to secure housing 22 at an opening formed in a work surface. Fastener 50 includes upper portion 52 that has surface 54. Surface 54 is shaped and configured to engage a bottom or lower side of the work surface. Fastener 50 is further described in detail in the ensuing description.

Figure 3:
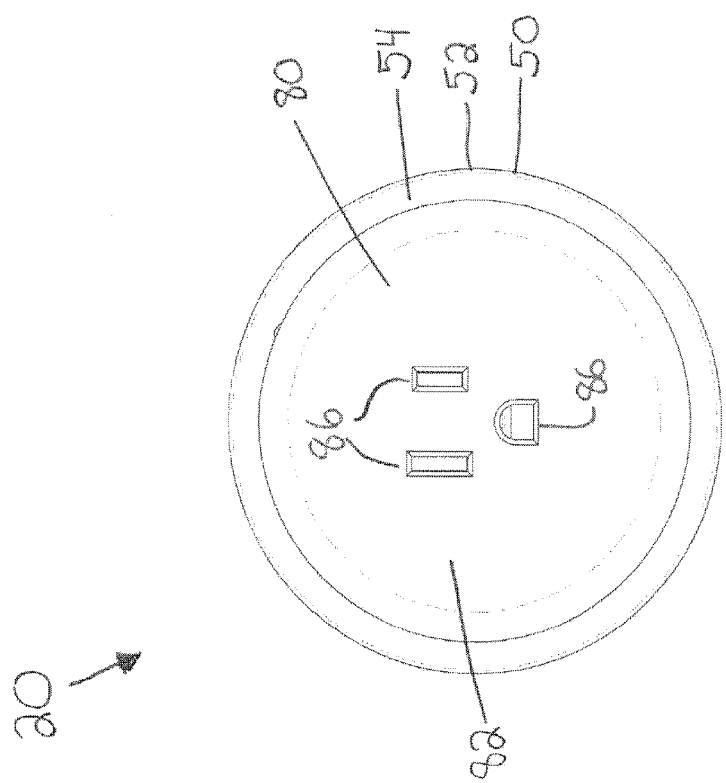
FIG. 3 is a top plan view of the grommet assembly.
Figure 4:
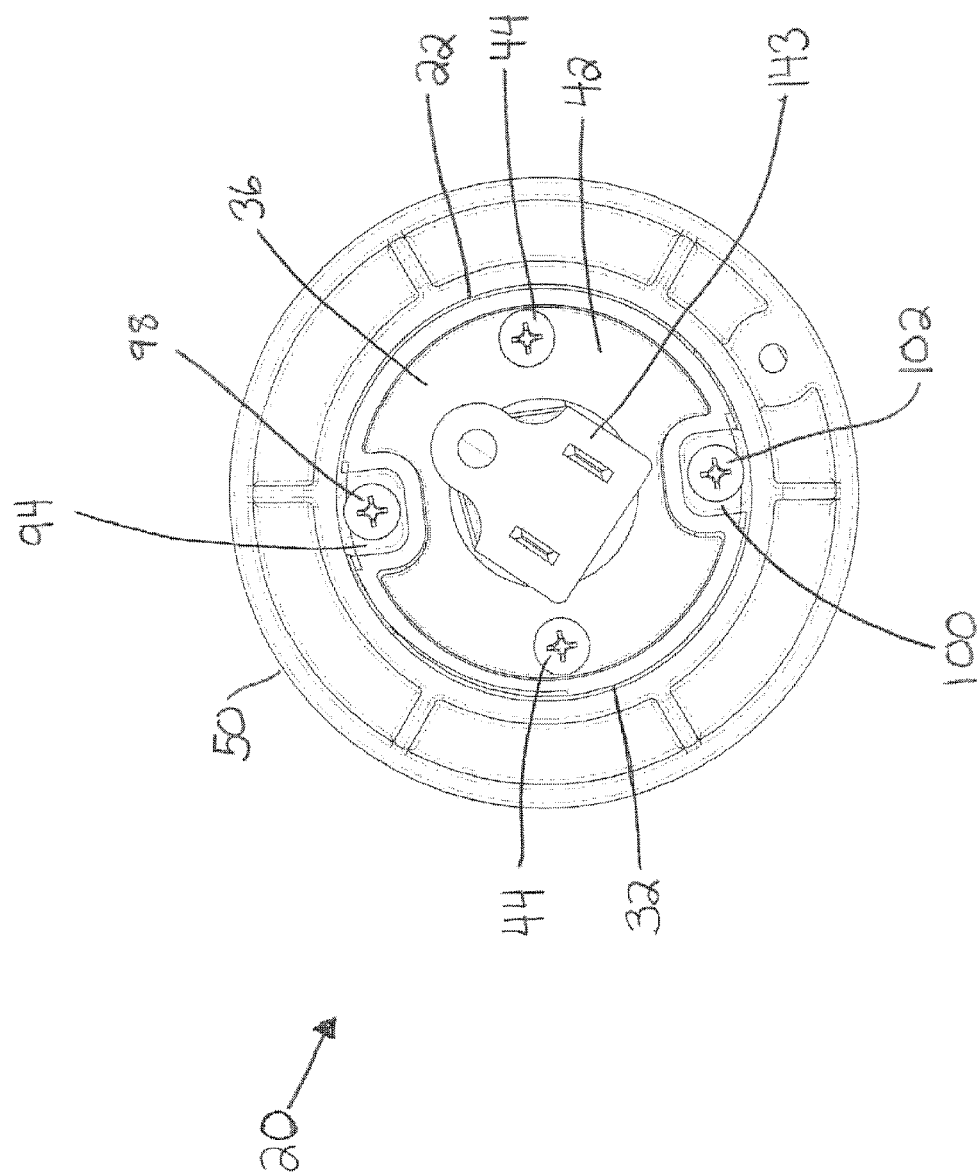
FIG. 4 is a bottom view of the grommet assembly.
Figure 5A:
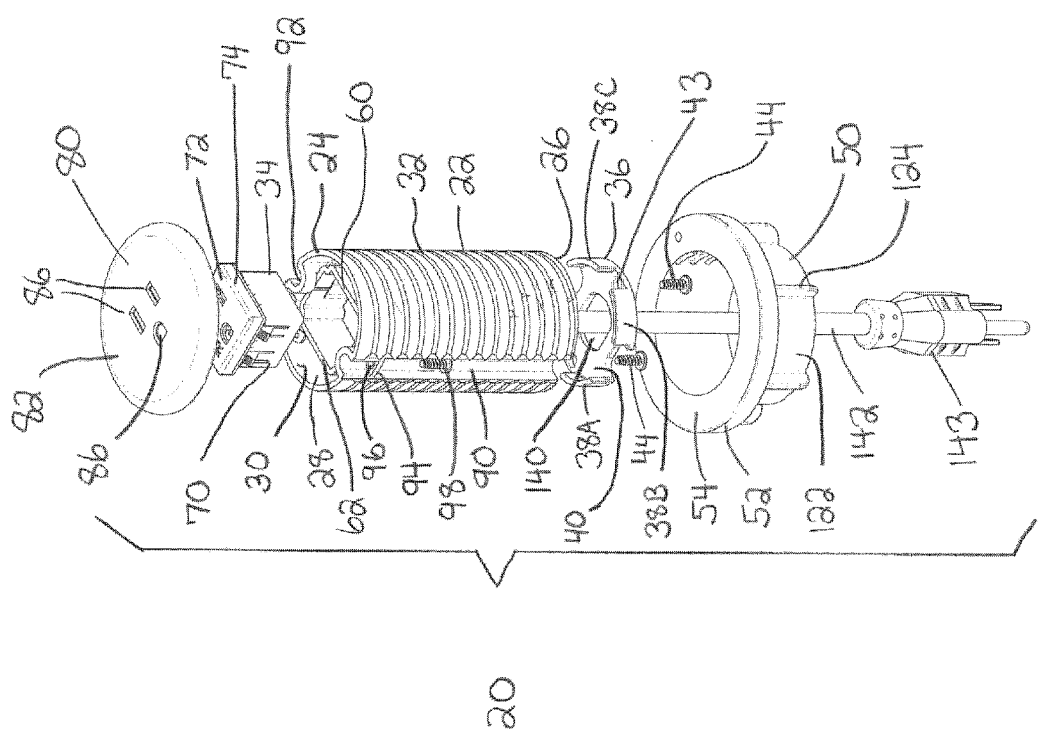
FIG. 5A is an exploded view of the grommet assembly.
Figure 5B:
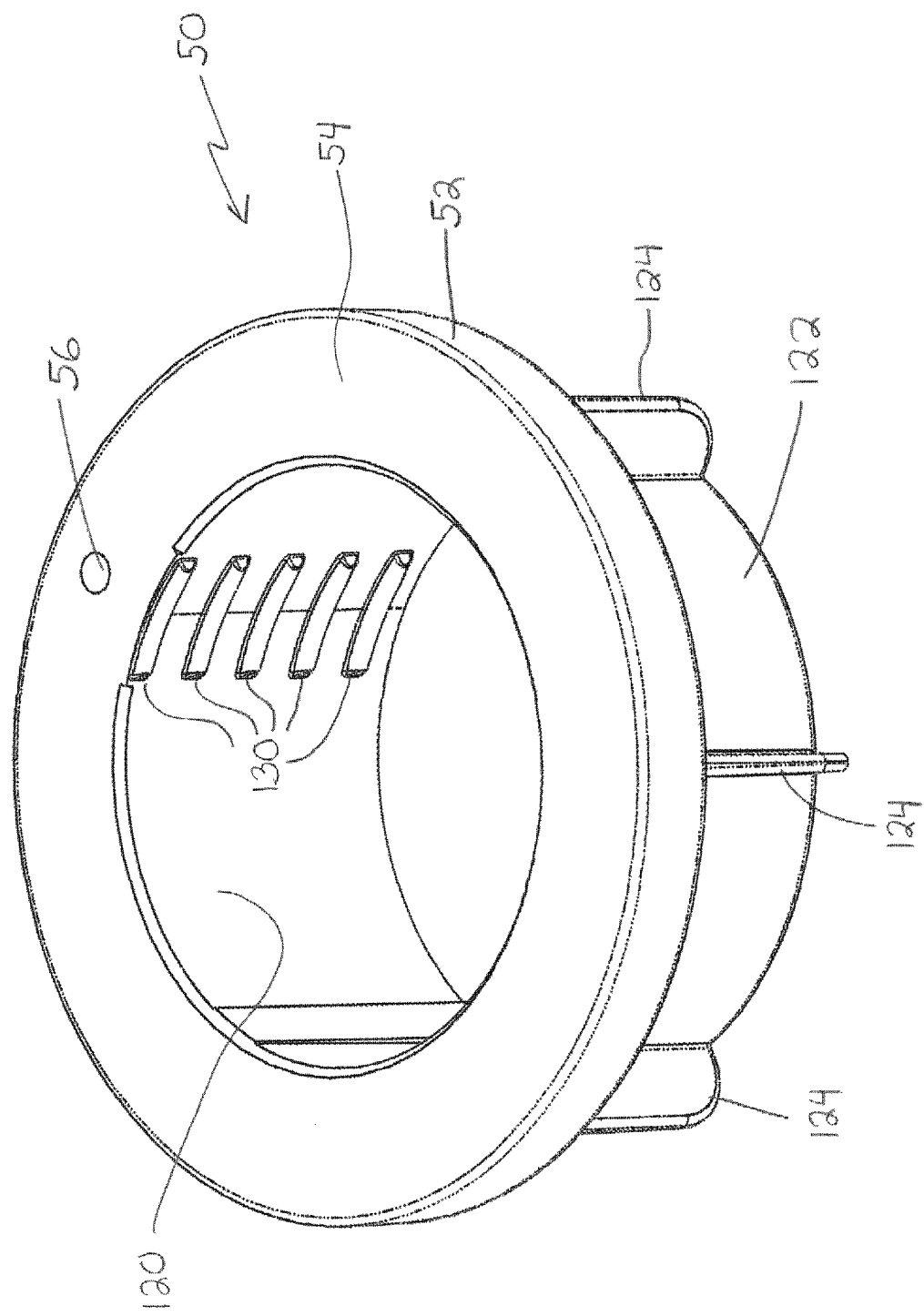
FIG. 5B is a perspective view of a fastener shown in FIG. 5A, the view showing a top portion of the fastener.

Referring to FIGS. 3 and 5A, housing 22 includes sleeve structure 60 within interior region 28 and attached to interior wall 30. Sleeve structure 60 is sized and configured to support electrical power receptacle 34. In one embodiment, sleeve structure 60 is integral with interior wall 30. In another embodiment, sleeve structure 60 is attached to interior wall 30. Sleeve structure 60 includes opened top end 62. Electrical power receptacle 34 includes lower portion 70 that is disposed within sleeve structure 60 and upper portion 72. Upper portion 72 has overhanging portion 74 that is supported by top end 62. Sleeve structure 60 is configured and position so that upper portion 72 of electrical power receptacle 34 is located at top end 24 of housing 22. Electrical power receptacle 34 includes at least one input for receiving an electrical device. For example, in the embodiment shown in FIGS. 1, 3 and 5A, electrical power receptacle 34 comprises an AC power receptacle that has inputs for receiving the electrically conductive prongs or blades of a male electrical plug.

Figure 2:
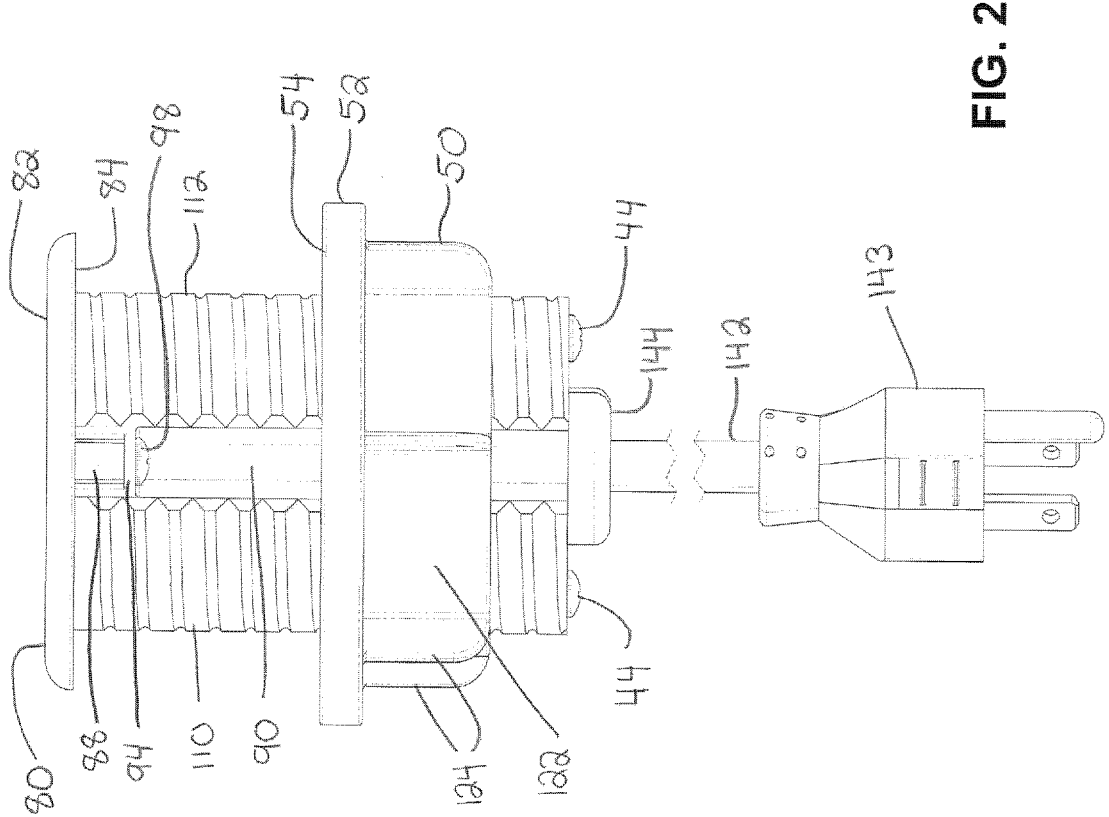
FIG. 2 is a side elevational view of the grommet assembly.

Referring to FIGS. 1-3 and 5A, grommet assembly 20 further includes face plate 80. Face plate 80 is attached to housing 22 so as to cover upper portion 72 of electrical power receptacle 34. Face plate 80 includes top side 82 and bottom side 84. Face plate 80 includes openings 86 that are aligned with the electrically conductive inputs of electrical power receptacle 34. As shown in FIGS. 1, 2, 4 and 5A, housing 22 includes channels 90 and 92 in housing outer surface 32. Each channel 90 and 92 extends along an axis that is parallel to the longitudinally extending axis of housing 22. Each channel 90 and 92 extends to bottom end 26 of housing 22. The shape of each channel 90 and 92 forms part of the perimeter of bottom end 26. Accordingly, bottom cover 36 has a shape that conforms to the perimetrical shape of bottom end 26. In an exemplary embodiment, channels 90 and 92 are diametrically positioned. Housing 22 further includes transverse portion 94 that extends across channel 90 and is in proximity to face plate 80. Transverse portion 94 includes through-hole 96 for receiving a fastener or screw 98. Similarly, housing 22 further includes a transverse portion (not shown) that extends across channel 92 and is in proximity to face plate 80. The transverse portion across channel 92 includes a through-hole, not shown but similar to through-hole 96, for receiving a fastener or screw which, as will be apparent from the ensuing description, perform the same function as through-hole 96 and fastener 98, respectively. Faceplate 80 includes a pair of post members that extend from bottom side 84. One of these post members is post member 88 shown in FIG. 2. In an exemplary embodiment, the post members extending from bottom side 84 are diametrically positioned. In an exemplary embodiment, each post member extending from bottom side 84 has the same structure and function as post member 370 shown in FIG. 11H which is discussed in the ensuing description. Each post member that extends from bottom side 84 has an end that is configured to have a threaded inlet. In order to attach face plate 80 to housing 22, faceplate 80 is positioned so that the end of each post member is adjacent the through-hole of a corresponding transverse portion. A screw is then inserted through the through-hole of the transverse portion and threadedly engaged with the threaded inlet of the post member. For example, as shown in FIG. 2, the end of post member 88 is adjacent to transverse portion 94. Screw 98 is inserted through the through-hole 96 of transverse portion 94 and threadedly engaged with the threaded inlet in the end of post member 88. In one embodiment, the post members extending from bottom side 84 are integral with face plate 80. In another embodiment, the post members extending from bottom side 84 are attached to bottom side 84. Each channel 90 and 92 is sized to allow placement therein of the shaft of tool (e.g. screwdriver) for the purpose of tightening or loosening the screws (e.g. screw 98) that are threadedly engaged with the threaded inlets of the post members.

Referring to FIGS. 1, 2 and 5A, housing outer surface 32 of housing 22 has a first curved section 110 and a second curved section 112. First curved section 110 and second curved section 112 are separated by channels 90 and 92. In one embodiment, channels 90 and 92 are diametrically positioned and the surface areas of first curved section 110 and second section 112 are equal. First curved section 110 and second curved section 112 are both threaded. Referring to FIGS. 1, 2, 5B and 5C, in exemplary embodiment, fastener 50 comprises a collar that is configured to be threadedly engaged with the threaded first curved section 110 and threaded second curved section 112. Collar 50 further includes interior wall 120, exterior wall 122 and ribs 124 that are integral with exterior wall 122. Ribs 124 provide structural support for collar 50. Interior wall 120 includes at least one protrusion 130 for engaging threaded first curved section 110 and threaded second curved section 112. In exemplary embodiment, there is a plurality of protrusions 130 that are arranged vertically and in juxtaposition. In one embodiment, there are several groups of protrusions 130 on interior wall 120. In an alternate embodiment, collar 50 includes through-hole 56 that is sized to receive a fastener device (e.g. screw) for fastening or attaching collar 50 to the underside of the work surface.

Referring to FIGS. 1, 2 and 5A, bottom cover 36 includes opening 140 for the passage there-through of electrical cable 142. Electrical cable 142 includes electrical wires that are electrically connected to electrical power receptacle 34 or electrical circuitry, as will be explained in the ensuing description. In one embodiment, electrical cable 142 includes male electrical plug 143 that is configured to be plugged into a standard AC voltage receptacle that provides 110-120 VAC. In an exemplary embodiment, strain relief member 144 is lodged or positioned in opening 140 and electrical cable 142 extends through the strain relief member 144.

Figure 5D:
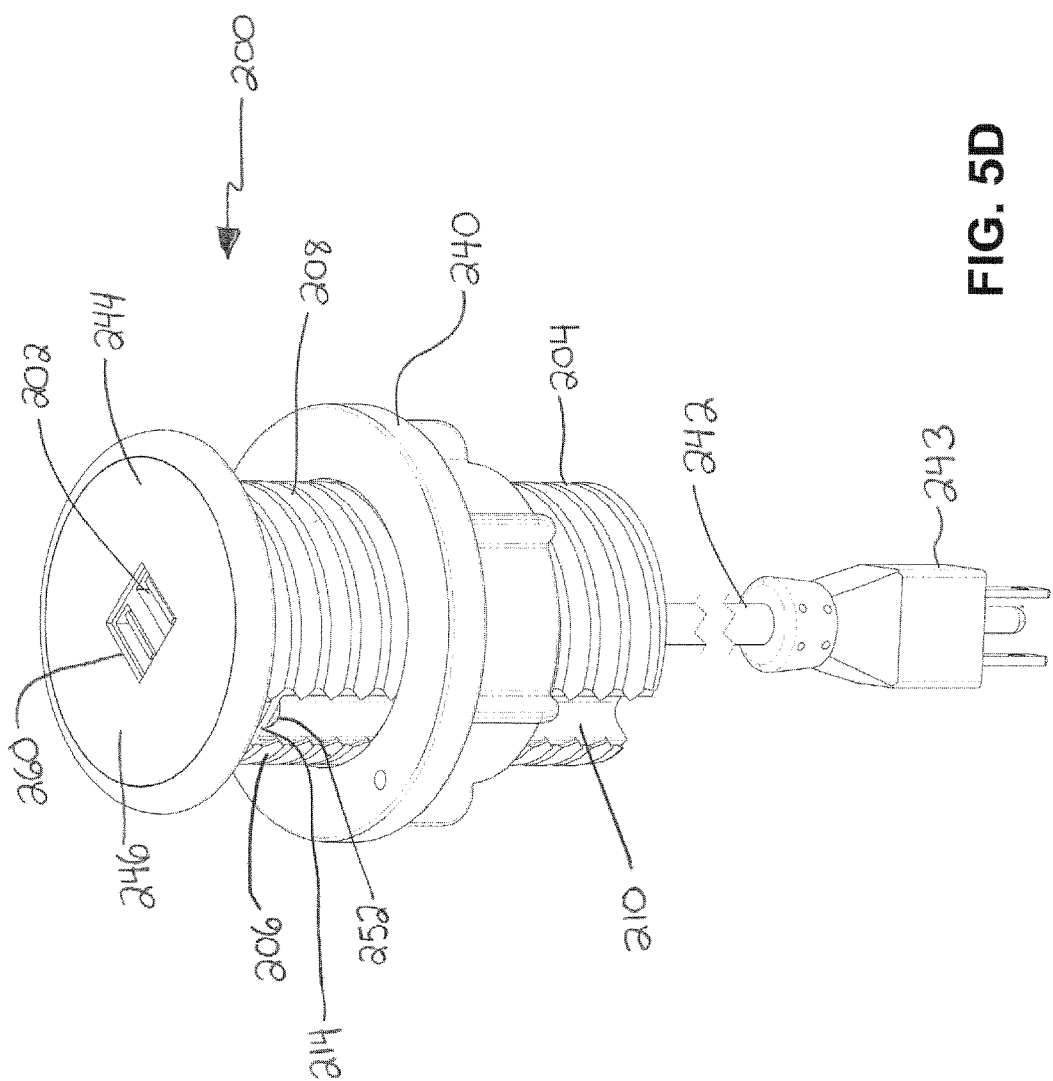
FIG. 5D is a perspective view of a grommet assembly in accordance with another exemplary embodiment of the invention.
Figure 5E:
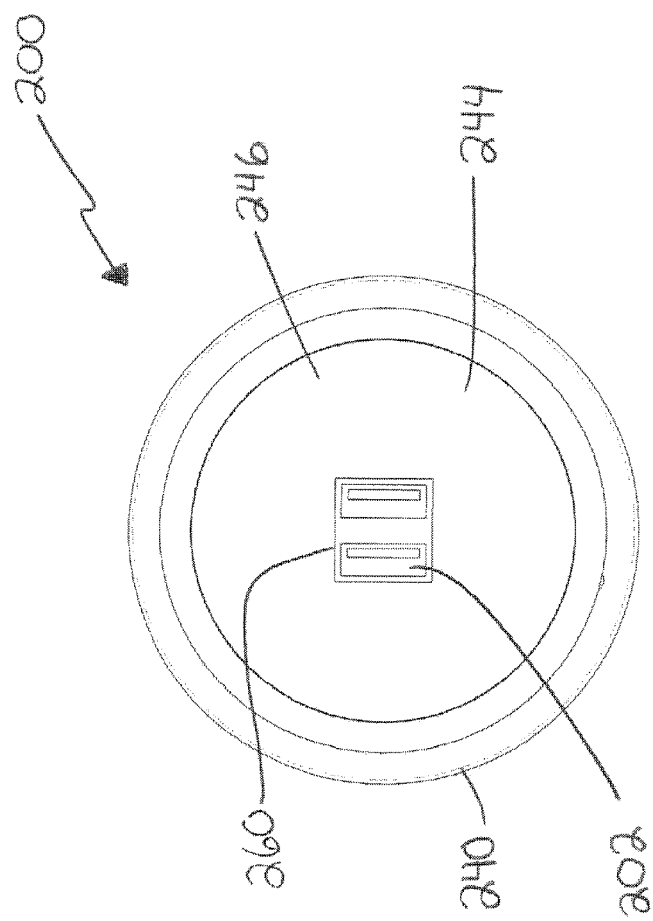
FIG. 5E is a top plan view of the grommet assembly of FIG. 5D.
Figure 5F:
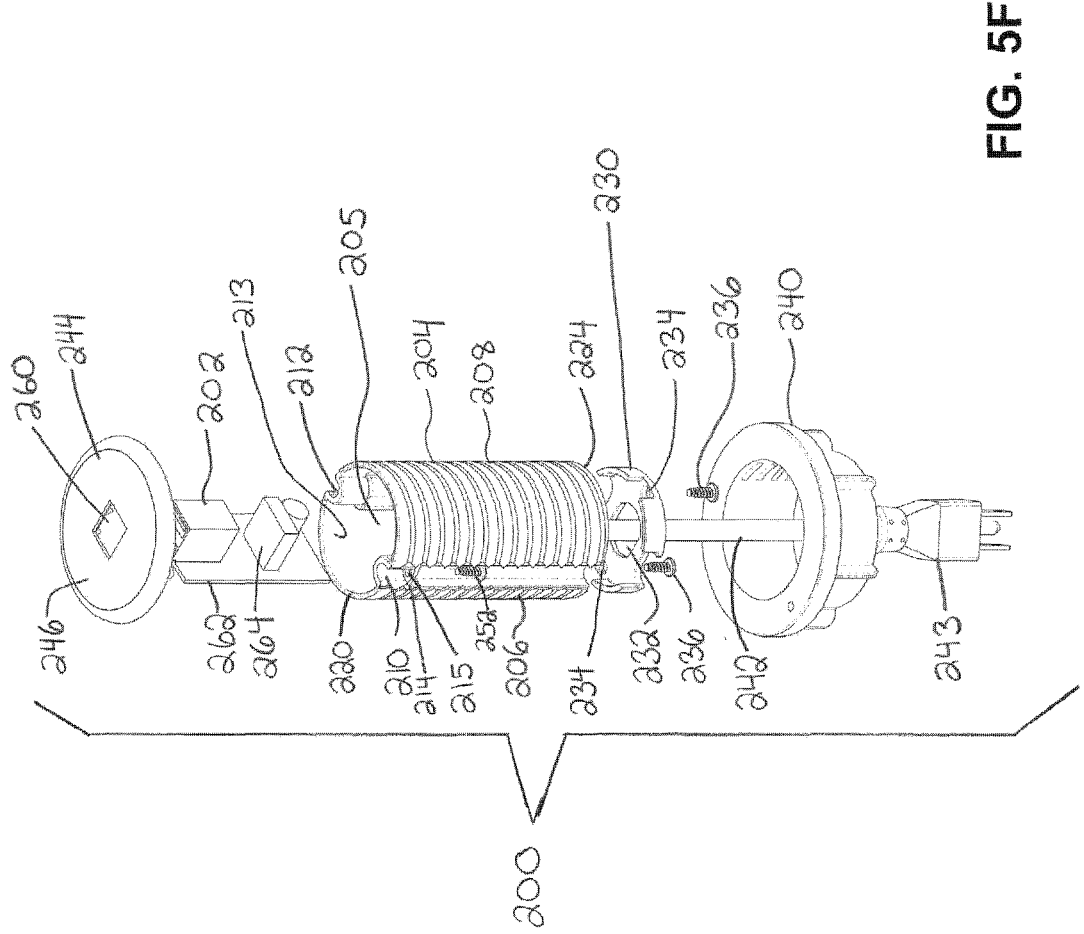
FIG. 5F is an exploded view of the grommet assembly of FIG. 5D.
Figure 7:
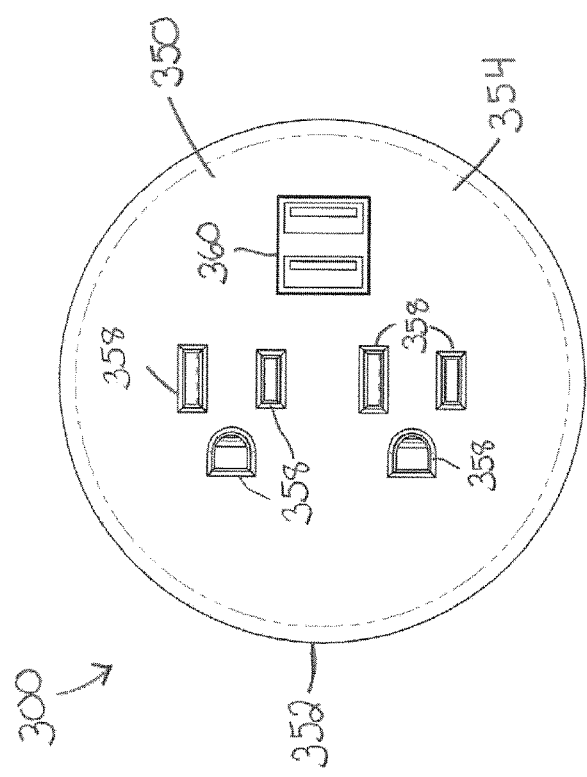
FIG. 7 is a top plan view of the grommet assembly of FIG. 6.
Figure 8:
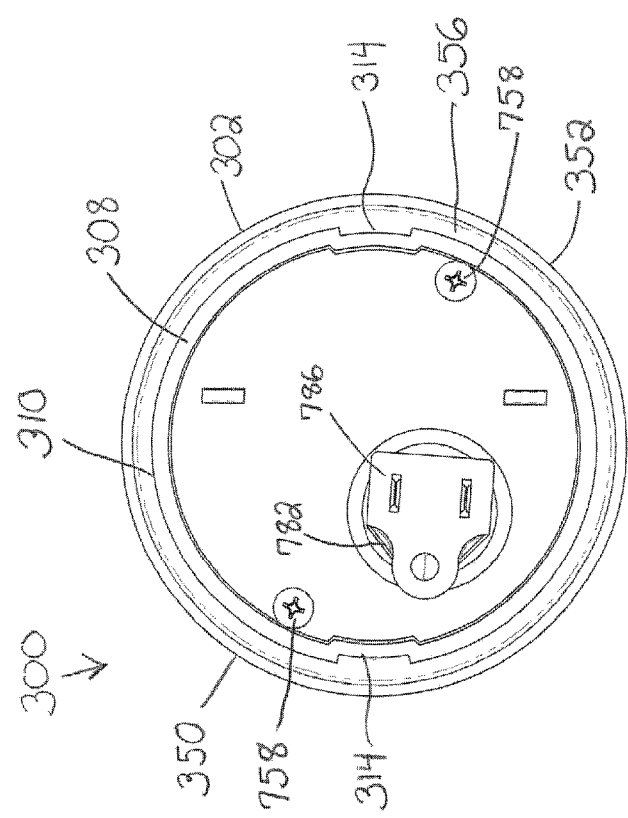
FIG. 8 is a view of the bottom of the grommet assembly of FIG. 6.
Figure 9:
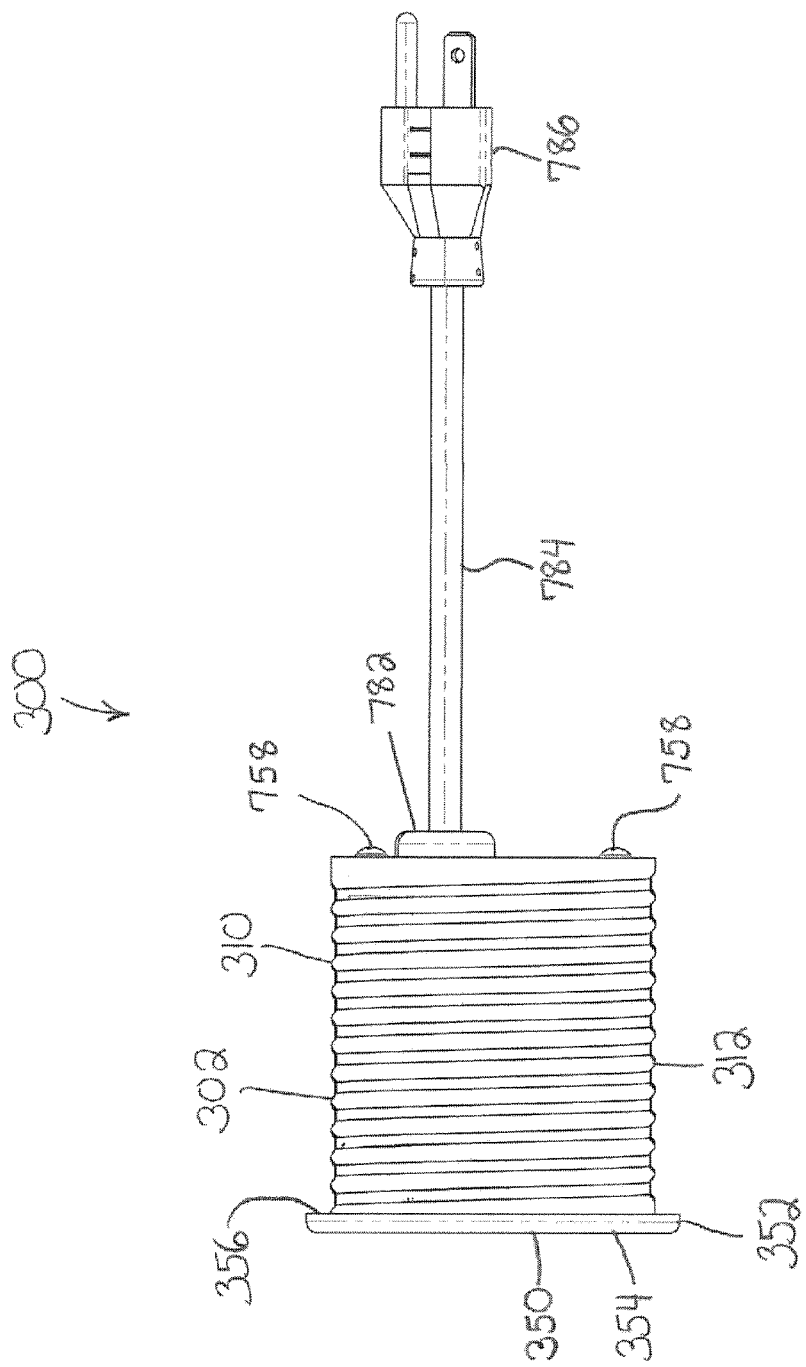
FIG. 9 is a side view of the grommet assembly of FIG. 6.
Figure 10:
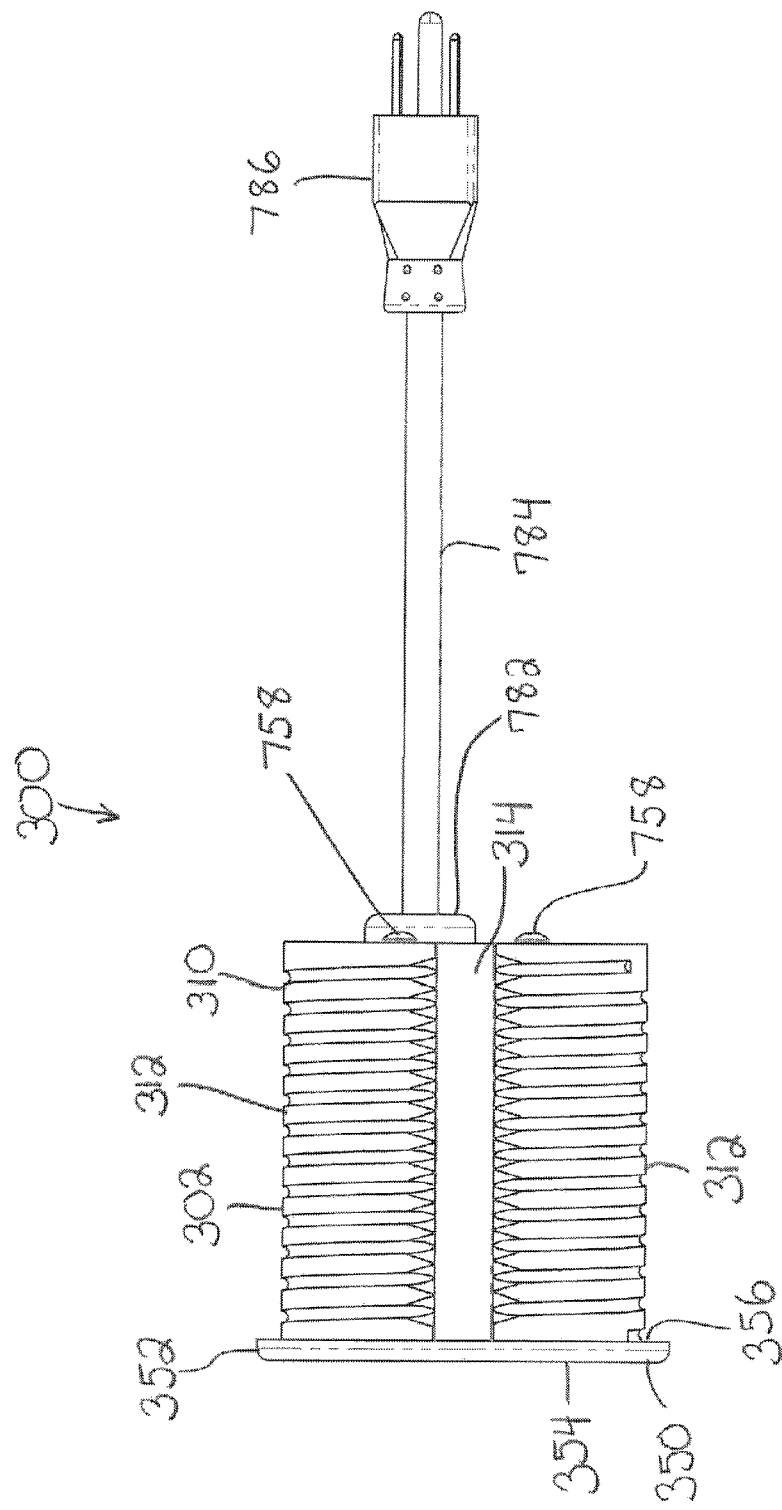
FIG. 10 is another side view of the grommet assembly of FIG. 6.

Referring to FIGS. 5D, 5E and 5F, there is shown grommet assembly 200 in accordance with another embodiment of the present invention. Grommet assembly 200 includes an electrical power receptacle 202 that comprises twin USB Type-A Female Sockets. Grommet assembly 200 includes single-piece housing 204 that has the same exterior surface configuration as housing 22. Housing 204 includes interior region 205, first curved surface 206 and second curved surface 208 that are separated by channels 210 and 212. Housing 204 further includes interior wall 213. Housing 204 includes transverse portion 214 within channel 210 and another transverse portion (not shown) in channel 212. Channels 210 and 212 have the same shape, size and configuration as channels 90 and 92, respectively, described in the foregoing description. Channels 210 and 212 provide the same function as channels 90 and 92, respectively. The transverse portions in channels 210 and 212 have the same structure and function as the transverse portion 94 in channel 90 and transverse portion 100 in channel 92.

Referring to FIGS. 5D, 5E and 5F, housing 204 includes open top end 220 and open bottom end 224. Grommet assembly 200 further includes bottom cover 230 that has the same structure and configuration as bottom cover 36 described in the foregoing description. Bottom cover 230 includes central opening 232 and through-holes 234 for receiving screws 236. Housing 204 includes threaded inlets (not shown) located within interior region 205 and attached to interior wall 213. In order to attach bottom cover 230 to housing 204, screws 236 are inserted into through-holes 234 and threadedly engaged with the threaded inlets (not shown) that are within interior region 205.

Referring to FIGS. 5C, 5D and 5E, fastener or collar 240 has the same structure and purpose as fastener or collar 50 described in the foregoing description. Collar 240 is threadedly engaged to first curved surface 206 and second curved surface 208. Electrical cable 242 has the same configuration and purpose as electrical cable 142 described in the foregoing description. In one embodiment, electrical cable 242 includes male electrical plug 243 that is configured to be plugged into a standard 110-120 VAC receptacle.

Grommet assembly 200 further includes face plate 244. Face plate 244 includes top side 246, a bottom side (not shown) and at least one post member (not shown) that extends from the bottom side of face plate 244. Each post member (not shown) that extends from the bottom side of face plate 244 has the same structure and function as post member 88 described in the foregoing description and shown in FIG. 2. Each post member (not shown) that extends from the bottom side of face plate 244 has a threaded inlet that is configured to engage a corresponding screw 252 which is inserted through opening 215 in transverse portion 214 and the opening (not shown) in the transverse portion (not shown) in channel 212. Thus, face plate 244 is attached to housing 204 in the same manner as face plate 80 is attached to housing 22.

Referring to FIGS. 5D, 5E and 5F, face plate 244 includes opening or through-hole 260 that is aligned with the USB female sockets of the twin USB Type-A Female Socket device 202. Twin USB Type-A Female Socket device 202 is mounted to circuit board 262. Electrical components 264 are also mounted to circuit board 262 and convert 110-120 VAC to a DC voltage and current that is suitable for charging USB-type devices, such as smart phones, iPads, tablets, etc. This DC voltage and current are available at the USB female sockets of device 202. Circuit board 262 is disposed within interior region 205 of housing 204. Housing 204 includes an internal structure (not shown) within interior region 205 that supports circuit board 262. In exemplary embodiment, the internal structure within interior region 205 contains slots into which portions of circuit board 262 slide. However, it is to be understood that other suitable internal structures may be used in interior region 205 to support or secure circuit board 262. Electrical cable 242 extends through a strain relief (not shown) lodged within central opening 232 in bottom cover 230 and is electrically connected to electrical components 264.

Referring to FIGS. 6-10 and 11A-D there is shown grommet assembly 300 in accordance with another exemplary embodiment of the present invention. Grommet assembly 300 includes single-piece housing 302. Housing 302 is substantially cylindrical in shape and has longitudinally extending axis 303 (see FIG. 11H), interior region 304 and interior wall 305 surrounding interior region 304. Housing 302 includes opened top end 306, opened bottom end 308 and housing outer surface 310. Housing outer surface 310 includes threaded portions 312 and non-threaded portions 314. Each non-threaded portion 314 has a strip-like shape and extends to open bottom end 308 along an axis that is parallel to longitudinally extending axis 303. In an exemplary embodiment, non-threaded portions 314 of housing outer surface 310 are equidistantly spaced. In an exemplary embodiment, there are three non-threaded portions 314 that are center-lined spaced apart by 120°. In one embodiment, each non-threaded portion 314 has a smooth surface.

Referring to FIGS. 6 and 12-14, grommet assembly 300 further includes fastener 320 for engaging threaded portions 312 of housing outer surface 310. Fastener or collar 320 is configured to be threadedly engaged to threaded portions 312 of housing outer surface 310. In an exemplary embodiment, collar 320 includes upper portion 321, inner collar wall 322 and exterior wall 323. Inner collar wall 322 has at least one protrusion 324 for engaging threaded portions 312 of housing outer surface 310. Non-threaded portions 314 allow collar 320 to be maneuvered along housing outer surface 310 without protrusions 324 becoming threadedly engaged with threaded portions 312. Exterior wall 323 includes ribs 325 that provide structural integrity to collar 320 and also provide grips for a user to grasp when rotating collar 320 on housing 302. In order to mount collar 320 on housing outer surface 310, the user orients collar 320 so that protrusions 324 are aligned with non-threaded portions 314. The user then slides or moves collar 320 over housing outer surface 310 so that protrusions 324 travel along non-threaded portion 314 until collar 320 is at a desired position on housing outer surface 310. Once collar 320 is at the desired position, the user can use his or her hand to rotate collar 320 so that protrusions 324 become threadedly engaged with threaded portions 312. The user continues to rotate collar 320 until upper surface 330 of upper portion 321 abuts bottom side 404 of work surface 402 (see FIG. 16). Upper portion 321 of collar 320 includes extending portion 334 which has through-hole 336. Through-hole 336 is sized for receiving a screw or similar fastening device for fastening or attaching collar 320 to bottom side 404 of work surface 402 when collar 320 is rotated to the maximum extent.

Figure 12:
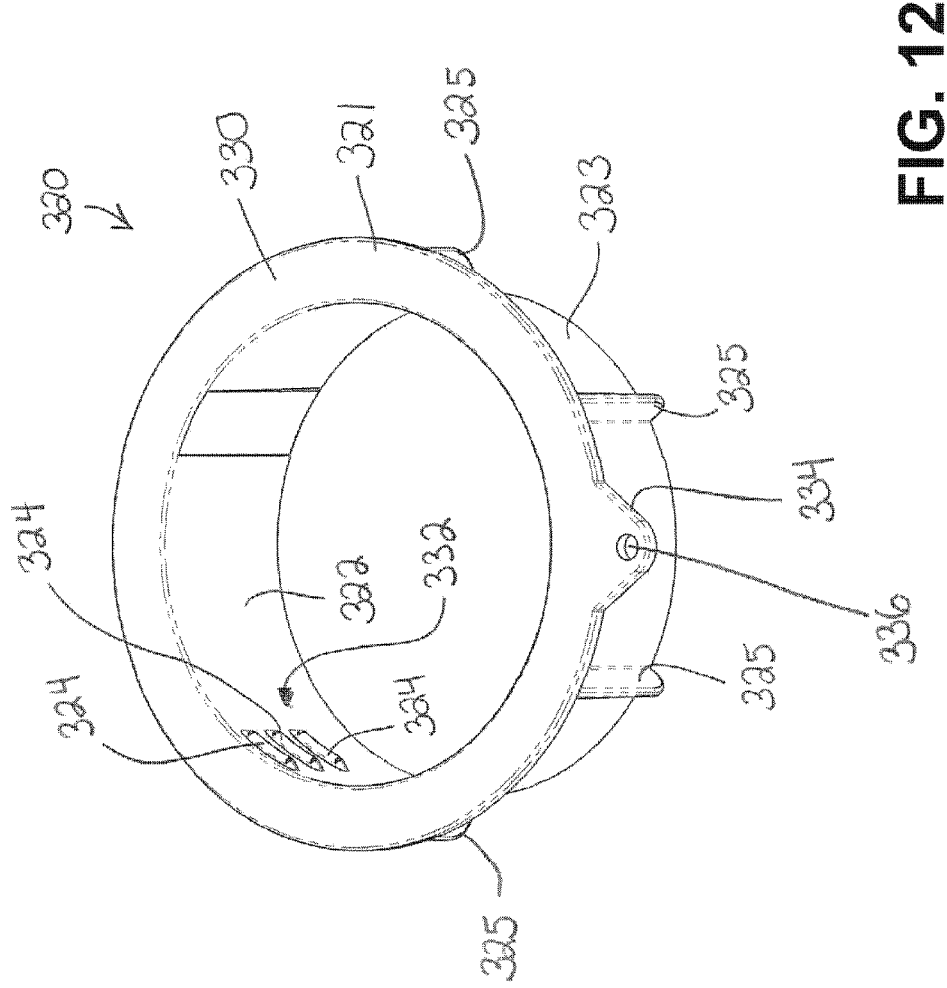
FIG. 12 is a perspective view of a fastener shown in FIG. 11H, the view showing a top portion of the fastener.
Figure 13:
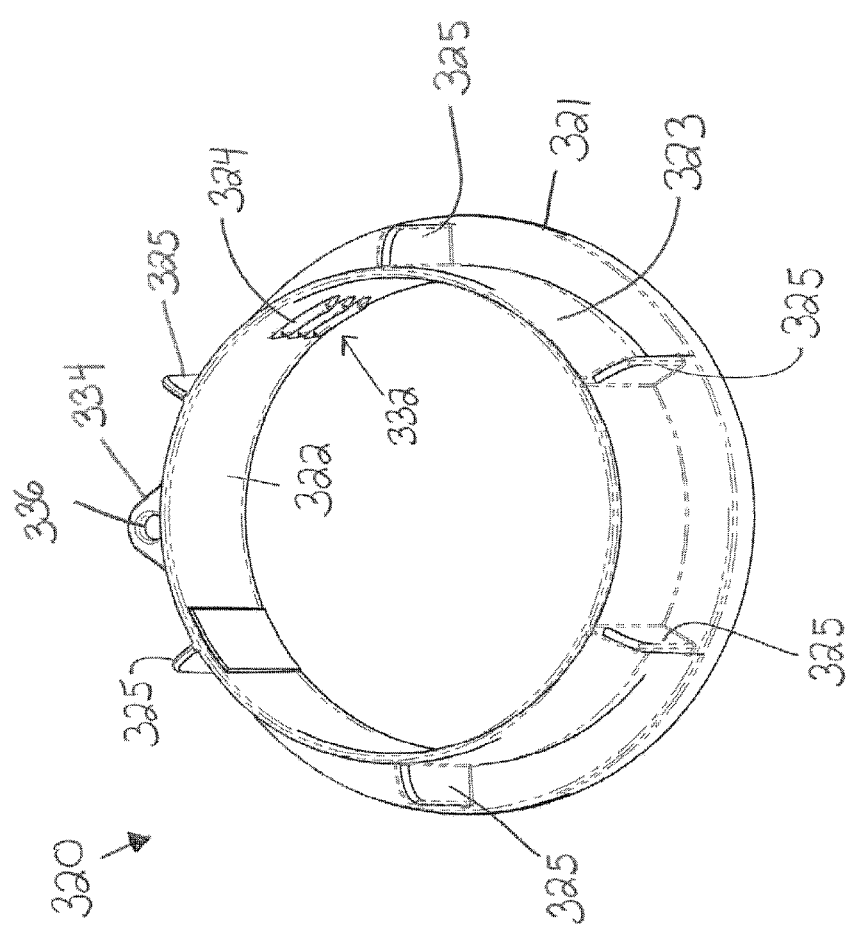
FIG. 13 is another perspective view of the fastener shown in FIG. 11H, the view showing a bottom portion of the fastener.
Figure 14:
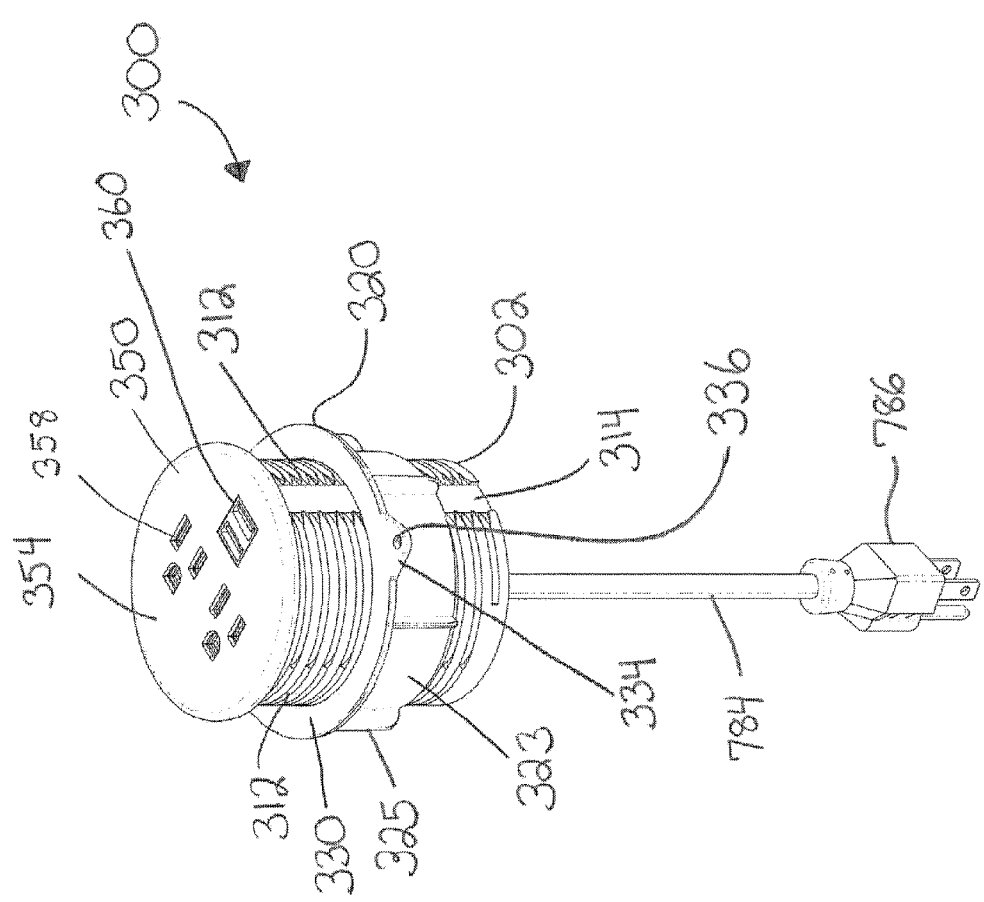
FIG. 14 is a perspective view of the grommet assembly of FIG. 6, the view showing the fastener of FIG. 12 threadedly engaged to the outer surface of the housing.

Referring to FIGS. 12 and 13, in an exemplary embodiment, the at least one protrusion 324 comprises a plurality of groups 332 of protrusions 324. The groups 332 of protrusions 324 are spaced apart by a predetermined distance so that each group 332 of protrusions 324 is aligned with a corresponding one of non-threaded portions 314. The protrusions 324 in each group 332 are arranged vertically and in juxtaposition.

Referring to FIGS. 6-10 and 15-17, housing 302 includes face plate 350. In an exemplary embodiment, face plate 350 is removably attached to housing 302. Face plate 350 has peripheral portion 352 that extends beyond the diameter of housing 302. Face plate 350 includes top side 354, bottom side 356, through-holes 358 and through-holes 360. Through-holes 358 are aligned with the openings in AC electrical receptacles 500 and 501 that are positioned within interior region 304 of housing 302 (see FIG. 11D). Opening 360 is aligned with dual USB female socket device 502 that is positioned within interior region 304 of housing 302 (see FIG. 11D). Dual USB female socket device 502 includes USB sockets 503 and 504 which are accessible through opening 360 in face plate 350. As shown in FIG. 11H, face plate 350 includes post members 370 that extend from bottom side 356 and are configured to have threaded inlets configured for threaded engagement with screws 700 (see FIG. 11H) as will be discussed in the ensuing description.

In an alternate embodiment, face plate 350 is rigidly attached to housing 302. In a further embodiment, face plate 350 is integral with housing 302.

Referring to FIGS. 15-17, in order to mount grommet assembly 300 to workstation 400, an opening or hole is formed in work surface 402. The diameter of the opening in workstation 402 is slightly larger than the diameter of housing 302 but less than the diameter of face plate 350. The housing 302 is then inserted through the opening in work surface 402. Since the diameter of face plate 350 is larger than the diameter of the opening in work surface 402, bottom side 356 of face plate 350 contacts and rests upon work surface 402. The user then positions collar 320 on housing 302 so that protrusions 324 are aligned with non-threaded portions 314 and then slides collar 320 upon housing outer surface 310 until it is positioned at a desired position. The use then rotates collar 320 such that protrusions 324 engage threaded portions 312 of housing outer surface 310. The user continues to rotate collar 320 until upper surface 330 of collar 320 physically contacts bottom side 404 of work surface 402.

Figure 11B:
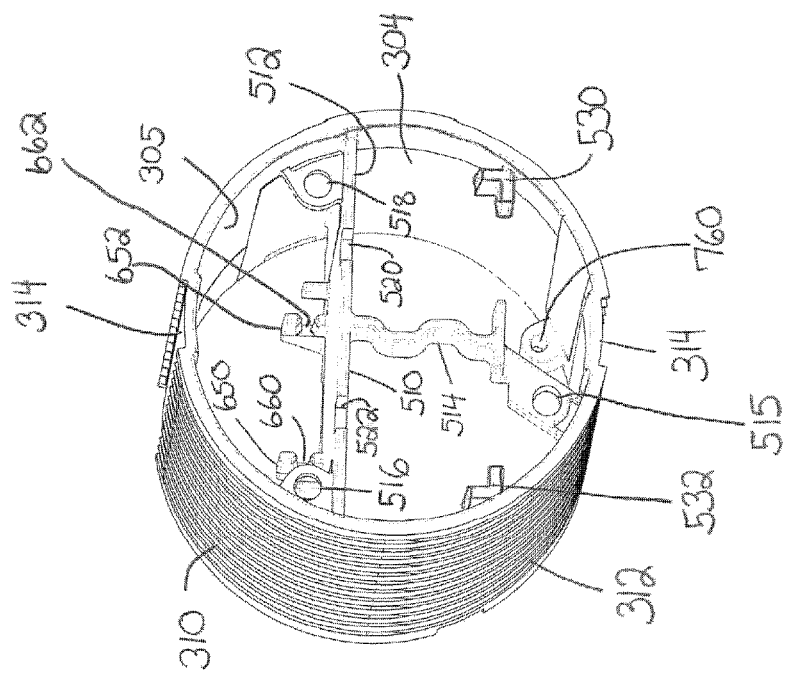
FIG. 11B is another perspective view of the single-piece housing, as seen from the bottom of the single-piece housing.
Figure 11A:
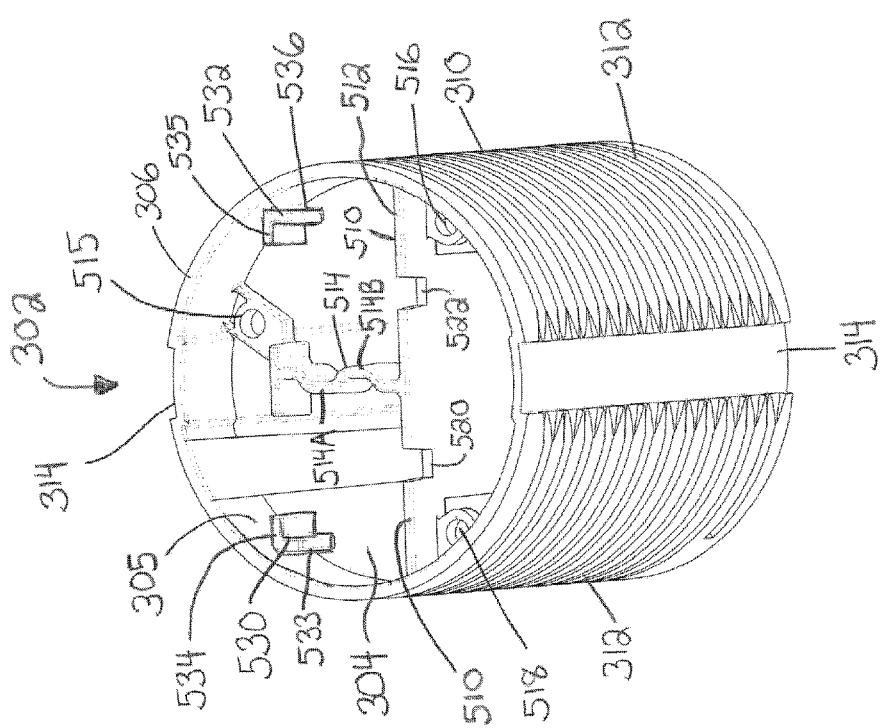
FIG. 11A is a perspective view of a single-piece housing of the grommet assembly of FIG. 6, as seen from the top of the single-piece housing.
Figure 11C:
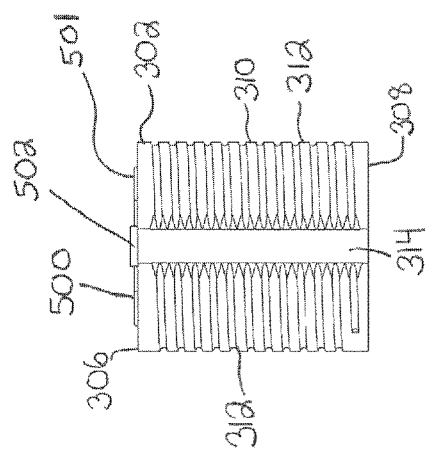
FIG. 11C is an elevational view of the single-piece housing having electrical power receptacles therein.

Referring to FIGS. 11A and 11B, there is shown housing 302. Housing 302 includes internal receptacle support structure 510 which is located within interior region 304 and attached to interior wall 305. Internal structure 510 includes wall section 512 and divider section 514. Internal structure 510 further includes extending portions that have openings 515, 516 and 518. Each opening 515, 516 and 518 is located so that it will be aligned with a corresponding one of post members 370 of face plate 350. In order to attach face plate 350 to housing 302, each screw 700 (see FIG. 11H) is inserted into a corresponding one of openings 515, 516 and 518 and then threadedly engaged with a threaded inlet of a corresponding post member 370. The extending portion of internal structure 510 which has opening 515 is joined or attached to interior wall 305 of housing 302. Wall section 512 further includes notches 520 and 522. Each notch 520 and 522 is sized to receive a tab on a corresponding AC power receptacle. Such a tab is indicated by reference number 524 (see FIG. 1H) and is part of AC power receptacle 500. AC power receptacle 501 also has a tab (not shown) that performs the same function as tab 524. Divider section 514 has a serpentine shape and includes portion 514A and portion 514B. The purpose of portions 514A and 514B is discussed in the ensuing description.

Figure 11D:
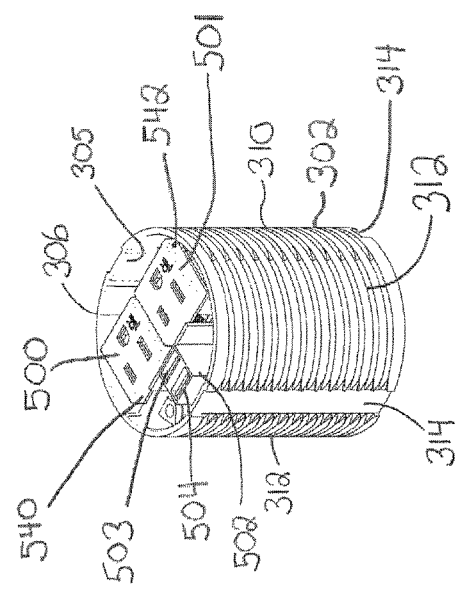
FIG. 11D is a perspective view of the single-piece housing shown in FIG. 11C.

Housing 302 further includes support members 530 and 532 that are attached to or integral with interior wall 305. Support member 530 includes sections 533 and 534 which are angulated with respect to each other. In an exemplary embodiment, sections 533 and 534 form a right angle. Similarly, support member 532 includes section 535 and section 536 which are angulated with respect to each other. In an exemplary embodiment, sections 535 and 536 form a right angle. Each AC receptacle 500 and 501 includes an upper peripheral portion that has an overhanging portion. For example, as shown in FIG. 11D, the upper peripheral portion of AC receptacle 500 includes overhanging portion 540. Overhanging portion 540 of AC receptacle 500 rests or sits upon support member 530 and portion 514A of divider section 514, and tab 524 is lodged or positioned within notch 520. Similarly, the overhanging portion 542 of the upper peripheral portion of AC receptacle 501 (see FIG. 11D) rests or sits upon support member 532 and portion 514B of divider section 514, and the tab (not shown) of AC receptacle 501 is lodged or positioned within notch 522 of wall section 512.

Figure 11E:
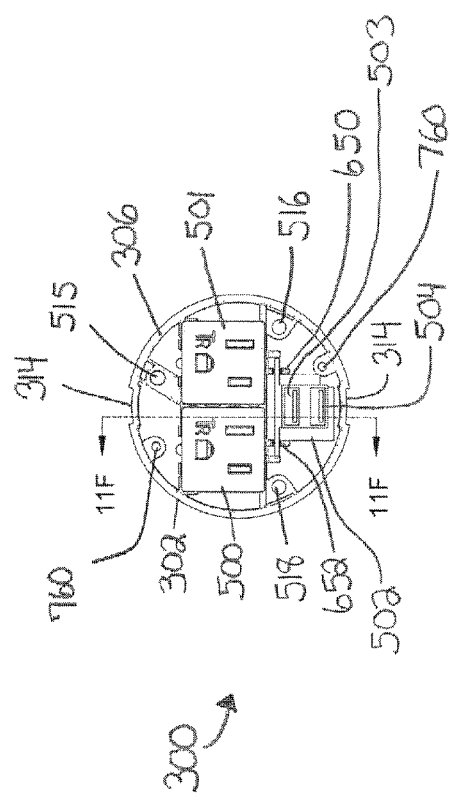
FIG. 11E is a top view plan view of the single-piece housing shown in FIG. 11C.
Figure 11F:
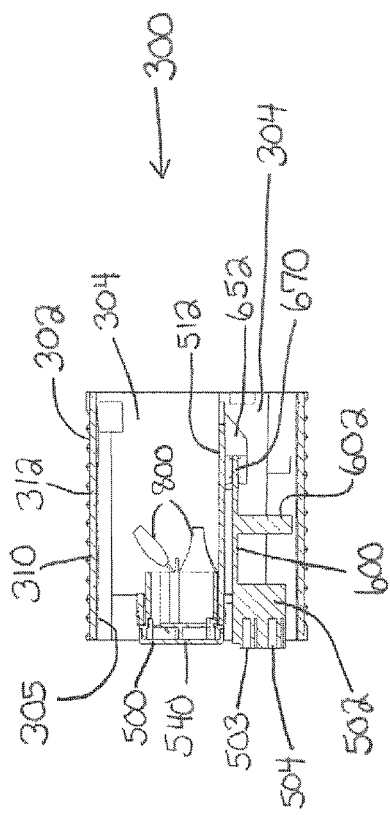
FIG. 11F is a cross-sectional view taken along line 11F-11F in FIG. 11E.

Referring to FIGS. 11B, 11E, 11F and 11G, grommet assembly 300 further includes electrical circuit board 600. Dual USB female socket device 502 is attached to circuit board 600. Electrical circuit board 600 has mounted thereto electrical components 602 and 604, and additional electronic components that are not shown, that convert 110-120 VAC to a DC voltage and current suitable for charging USB-type electronic devices, e.g. smart phones, tablets, PDAs, etc. Wall 512 of internal structure 510 includes retainer members 650 and 652 (see FIG. 11B) that protrude from wall 512. Each retainer member 650 and 652 defines a slot sized for receiving a portion of circuit board 600. Specifically, retainer member 650 defines slot 660 and retainer member 652 defines slot 662. Referring to FIG. 11F, portion 670 of electrical circuit board 600 is lodged within slot 662 of retainer member 652.

Figure 11G:
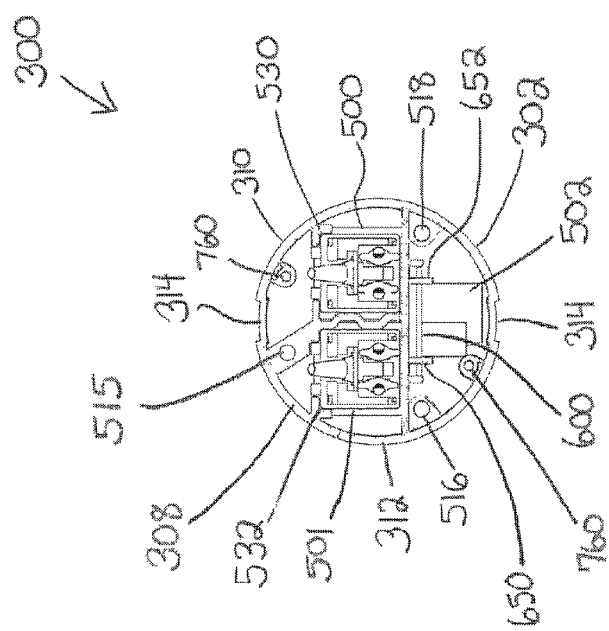
FIG. 11G is a bottom view of the single-piece housing as shown in FIG. 11C
Figure 11H:
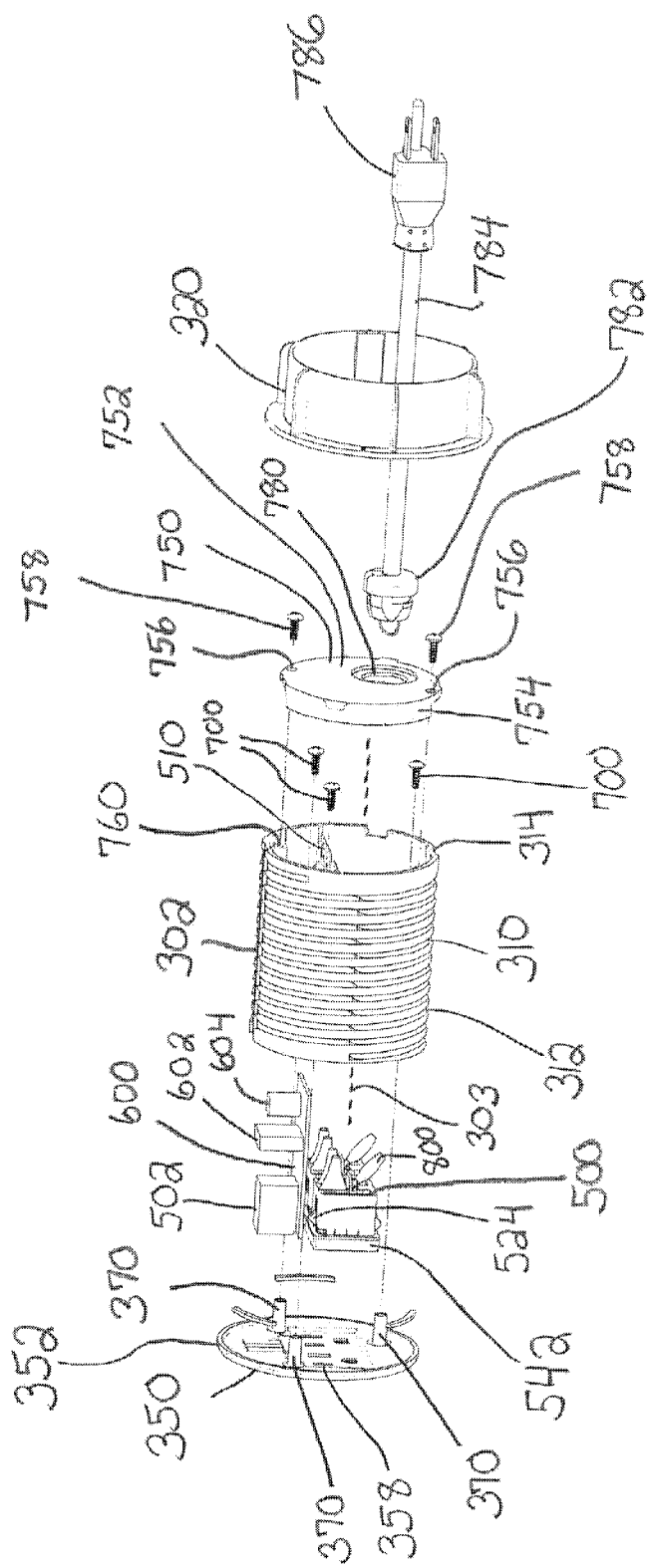
FIG. 11H is an exploded view of the grommet assembly of FIG. 6.

Referring to FIGS. 11F and 11H, in order to attach face plate 350 to housing 302, screws 700 are inserted through openings 515, 516 and 518 and threadedly engaged with the threaded inlets of post members 370 that extend from bottom side 356. Grommet assembly 300 further includes bottom cover 750 which is removably attached to housing 302. Bottom cover 750 includes exterior side 752 and sidewall 754. Bottom cover 750 further includes openings or through-holes 756 that are sized to receive screws 758. Referring to FIGS. 11E, 11G and 11H, housing 302 includes tabs that extend from interior wall 305 and which define threaded openings 760. In order to removably attach bottom cover 750 to housing 302, bottom cover 750 is positioned such that openings 756 are aligned with threaded openings 760. Screws 758 are then inserted into openings 756 and threadedly engaged with threaded openings 760. When bottom cover 750 is completely attached to housing 302, sidewall 754 is completely within interior region 304 and hidden from view. In an exemplary embodiment, bottom cover 750 is configured so that sidewall 754 contacts interior wall 305 when bottom cover 750 is completely attached to housing 302. Bottom cover 750 has an additional opening 780 that is sized to receive strain relief member 782. Electrical cable 784 extends through strain relief member 782. Opening 780 is sized so that strain relief member 782, with electrical cable 784 extending therethrough, is tightly lodged within opening 780. Electrical cable 784 includes male plug 786 which is configured to be plugged into a standard 110-120 VAC receptacle. Electrical cable 784 includes electric wires (not shown) that are electrically connected to the electrical circuitry on electrical circuit board 600 and the electrical contacts (not shown) of AC receptacles 500 and 501. The exposed ends (not shown) of the electrical wires (not shown) that are electrically connected to the electrical contacts of the AC receptacles 500 and 501 are covered with protective, electrically non-conductive jackets 800 (see FIG. 11F). In an exemplary embodiment, each jacket 800 is made from neoprene or polychloroprene rubber.

Any one of a variety of suitable materials may be used to fabricate grommet assemblies 20, 200 and 300, e.g. plastic, resin, rubber, PVC, metal, composite materials, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications so as to thereby enable others skilled in the art to best utilize the invention and various embodiments with various modifications as are suited to the particular use contemplated.

What is claimed is:

1. A grommet assembly for providing at least one electrical power receptacle to a work surface, comprising:
    a single-piece housing including an open top end, an open bottom end, an interior region, an interior wall surrounding the interior region and a housing outer surface, wherein the single-piece housing further includes a sleeve that is located within the interior region and is attached to the interior wall and is configured to support an electrical power receptacle;
    a bottom cover attached to the housing over the open bottom end and including sidewalls, an interior side facing the interior region of the housing and an opposite exterior side, the bottom cover being configured such that the sidewalls are within the interior region of the housing; and
    a fastener operable to secure the housing at an opening formed in a work surface, the fastener having an upper surface configured to engage a lower surface of the work surface.

2. The grommet assembly according to claim 1 wherein the sidewalls of the bottom cover are totally within the interior region of the housing and hidden from view.

3. The grommet assembly according to claim 1 wherein the bottom cover includes an opening for the passage therethrough of one or more electrical wires.

4. The grommet assembly according to claim 1 wherein the bottom cover includes an opening and a strain relief member lodged within the opening.

5. The grommet assembly according to claim 1 further comprising an electrical power receptacle within the interior region of the housing and supported by the sleeve, wherein the electrical power receptacle is an AC electric power receptacle.

6. The grommet assembly according to claim 1 further comprising an electrical power receptacle within the interior region of the housing and supported by the sleeve, wherein the electrical power receptacle is a USB female socket.

7. The grommet assembly according to claim 6 further comprising electrical circuitry within the interior region of the housing, the electrical circuitry configured to convert an AC voltage and current to a DC voltage and current and provide the DC voltage and current to the USB female socket.

8. The grommet assembly according to claim 1 wherein the bottom cover is removably attached to the housing.

9. The grommet assembly according to claim 8 wherein the housing includes at least one threaded inlet within the interior region and wherein the bottom cover is screwed to the at least one threaded inlet.

10. The grommet assembly according to claim 1 wherein the sleeve has an open top end that has a perimetrical edge.

11. The grommet assembly according to claim 10 further comprising an electrical power receptacle having a lower portion disposed within the sleeve and an upper portion supported by the perimetrical edge of the sleeve.

12. The grommet assembly according to claim 1 further comprising an electrical power receptacle supported by the sleeve, the electrical power receptacle having at least one input for receiving an electrical device.

13. The grommet assembly according to claim 12 further comprising a face plate attached to the housing at the open top end so as to cover the upper portion of the electrical power receptacle, the face plate having at least one opening that is aligned with the at least one input of the electrical power receptacle.

14. A grommet assembly for providing at least one electrical power receptacle to a work surface, comprising:
    a single-piece housing having a longitudinally extending axis and including an open top end, an open bottom end, an interior region, an interior wall surrounding the interior region and a housing outer surface, the housing being configured to support an electrical power receptacle within the interior region, wherein the housing is configured to have at least one channel in the housing outer surface that extends along an axis that is parallel to the longitudinally extending, wherein the at least one channel extends to the open bottom end of the housing;
    a bottom cover attached to the housing over the open bottom end and including sidewalls, an interior side facing the interior region of the housing and an opposite exterior side, the bottom cover being configured such that the sidewalls are within the interior region of the housing;
    a face plate attached to the housing and positioned to cover the open top end of the housing;
    wherein the housing further includes a transverse portion extending across the channel and in proximity to the face plate, the transverse portion having a through-hole;
    a fastener disposed through the through-hole and fastened to the face plate; and
    a device operable to secure the housing at an opening formed in a work surface, the device having a surface configured to physically contact a lower surface of the work surface.

15. The grommet assembly according to claim 14 wherein the faceplate includes a top side, a bottom side and an fastener receiving member on the bottom side, wherein the fastener is engaged to the fastener receiving member, and wherein the at least one channel is sized to allow placement of a tool shaft for the purpose of tightening or loosening the fastener.

16. The grommet assembly according to claim 14 wherein the at least one channel comprises a pair of channels spaced apart from each other by a predetermined distance.

17. The grommet assembly according to claim 16 wherein the single-piece housing is substantially cylindrical in shape and the pair of channels are diametrically positioned.

18. The grommet assembly according to claim 16 wherein the housing outer surface comprises a first curved section and a second curved section that is separated from the first curved section by the pair of channels.

19. The grommet assembly according to claim 16 wherein the sidewalls of the bottom cover are space apart.

20. A grommet assembly for providing at least one electrical power receptacle to a work surface, comprising:
    a single-piece housing having a longitudinally extending axis and including an open top end, an open bottom end, an interior region, an interior wall surrounding the interior region and a housing outer surface, the housing being configured to support an electrical power receptacle within the interior region, wherein the housing is configured to have pair of channels in the housing outer surface, each channel extending along an axis that is parallel to the longitudinally extending axis of the housing, each channel extending to the open bottom end of the housing;
    a bottom cover attached to the housing over the open bottom end and including sidewalls, an interior side facing the interior region of the housing and an opposite exterior side, the bottom cover being configured such that the sidewalls are within the interior region of the housing; and
    a fastener operable to secure the housing at an opening formed in a work surface, the fastener having an upper surface configured to engage a lower surface of the work surface.

21. The grommet assembly according to claim 20 wherein the housing outer surface includes a first threaded curved section and a second threaded curved section that is separated from the first curved section by the pair of channels.

22. The grommet assembly according to claim 21 wherein the fastener comprises a collar for threadedly engaging the threaded first curved section and the second threaded curved section.

23. The grommet assembly according to claim 22 wherein the collar has an inner collar wall that has at least one protrusion on the surface for engaging the threaded first curved section and the second threaded curved section.

24. The grommet assembly according to claim 23 wherein the at least one protrusion comprises a plurality of protrusions spaced apart and arranged vertically and in juxtaposition.

25. A grommet assembly for providing at least one electrical power receptacle to a work surface, comprising:
    a single-piece housing including an open top end, an open bottom end, an interior region, an interior wall surrounding the interior region and a housing outer surface, the housing being configured to support an electrical power receptacle within the interior region, wherein the housing is substantially cylindrical in shape and has a longitudinally extending axis, wherein the housing outer surface has threaded portions and non-threaded portions and wherein each of the non-threaded portions has a strip-like shape and extends to the open bottom end along an axis that is parallel to the longitudinally extending axis of the housing;
    a bottom cover attached to the housing over the open bottom end and including sidewalls, an interior side facing the interior region of the housing and an opposite exterior side, the bottom cover being configured such that the sidewalls are within the interior region of the housing; and
    a fastener operable to secure the housing at an opening formed in a work surface, the fastener having an upper surface configured to engage a lower surface of the work surface.

26. The grommet assembly according to claim 25 wherein each of the non-threaded portions has a smooth surface.

27. The grommet assembly according to claim 25 wherein the fastener comprises a collar for threadedly engaging the threaded portions of the housing outer surface.

28. The grommet assembly according to claim 27 wherein the collar has an inner wall that has at least one protrusion for threadedly engaging the threaded portions of the housing outer surface, the non-threaded portions allowing the collar to be maneuvered along the housing outer surface without the at least one protrusion becoming threadedly engaged with the threaded portions, wherein in order to mount the collar on the housing the collar is first oriented so that the at least one protrusion is aligned with the non-threaded portion and then the collar is moved over the housing outer surface such that the at least one protrusion travels along the non-threaded portion until the collar is at a desired position on the housing outer surface.

29. The grommet assembly according to claim 28 wherein the at least one protrusion comprises a plurality of groups of protrusions, each groups of protrusions being located at a predetermined location so that each group of protrusions can be aligned with a corresponding non-threaded portion of the housing surface when the collar is mounted on the housing outer surface.

30. A grommet assembly for providing at least one electrical power receptacle to a work surface, comprising:
- a one-piece housing having a longitudinal axis and including an open top end, an open bottom end, an interior region, an interior wall surrounding the interior region and a housing outer surface, the housing further including a structure within the interior region and attached to the interior wall and configured to receive and support an electrical power receptacle;
- a bottom cover attached to the housing over the open bottom end and including sidewalls, an interior side facing the interior region of the housing and an opposite exterior side, the bottom cover being configured such that the sidewalls are within the interior region of the housing; and
- a fastener operable to secure the housing at an opening formed in a work surface, the fastener having an upper surface configured to engage a lower surface of the work surface.

31. The grommet assembly according to claim 30 wherein the housing outer surface has threaded portions and non-threaded portions and wherein each of the non-threaded portions has a strip-like shape and extends to the open bottom end along an axis that is parallel to the longitudinally extending axis of the housing.

32. The grommet assembly according to claim 30 wherein the housing is substantially cylindrical in shape.

33. The grommet assembly according to claim 32 wherein the housing outer surface includes at least one threaded portion and wherein the fastener comprises a collar for threadedly engaging the threaded portion.

* * * * *